UNITED STATES PATENT OFFICE.

EMIL HIRSCHBERG, OF NEW YORK, N. Y.

IMPROVEMENT IN UTILIZING TIN SCRAP.

Specification forming part of Letters Patent No. 127,056, dated May 21, 1872.

*To all whom it may concern:*

Be it known that I, EMIL HIRSCHBERG, of the city, county, and State of New York, have invented a new and Improved Process for Utilizing Tin Scraps; and I do hereby declare the following to be a full, clear, and exact description thereof, which will enable those skilled in the art to make and use the same.

This invention consists in treating scraps of tinned sheet-iron, first, with diluted nitric acid; then with sulphate of soda and slaked lime, or carbonate of lime or of baryta, in such a manner that the tin is first converted into nitrate of tin, mixed with nitrate of lead and nitrate of iron, and from this mixture the nitrate of lead is precipitated as sulphate of lead by the action of the sulphate of soda, while the tin and iron are precipitated as oxides, which are finally separated, the largest portion of the nitric acid being recovered, to be used in a subsequent operation.

In carrying out my invention, I place the tin scraps in a wooden tank and pour on them nitric acid diluted with four times its weight of water. After ten or fifteen minutes, when all the tin has been dissolved, the liquor is drawn off and brought in another tank filled with scraps, and this process is repeated until the acid is exhausted. The iron scraps, free from tin, are thoroughly washed with water and dried. To the solution, which contains nitrate of tin, nitrate of lead, and nitrate of iron, I add sulphate of soda until all the lead is precipitated as sulphate of lead. After this has been separated by filtration, I add to the residuum slaked lime, or carbonate of lime, or carbonate of baryta in small portions at a time, whereby all the tin and iron are precipitated as oxides, which process is accelerated by boiling the liquid. After filtration, I add to the remaining liquid, which contains nitrate of baryta or nitrate of lime, a sufficient quantity of sulphuric acid to precipitate all the lime and baryta as pure sulphate of lime or pure sulphate of baryta (blanc fix.) The remaining liquor, which contains all the nitric acid, less about ten per cent., which amount is lost, is used for dissolving the next batch of scraps. The last precipitate, containing the oxides of tin and iron, is washed with water, dried and heated to redness, to make the oxide of tin insoluble in muriatic acid, which is used afterward for the purpose of dissolving the iron. By these means a solution of sesquichloride of iron is gained. The oxide of tin, which is thus freed from all other metals, is washed, dried, and reduced to metal by heating it to a white heat in the presence of coal.

By these means the utilization of tin scraps is effected in an economical manner, all the salts or compounds obtained by the process being in such a state that they can be used, while by far the largest quantity of the nitric acid used in the process is recovered, so that it can be employed over and over again.

What I claim as new, and desire to secure by Letters Patent, is—

The within-described process for utilizing tin scraps by treating the same with nitric acid, sulphate of soda, and lime, substantially in the manner set forth.

This specification signed by me this 9th day of April, 1872.

EMIL HIRSCHBERG.

Witnesses:
W. HAUFF,
E. F. KASTENHUBER.